(12) United States Patent
Tsujita

(10) Patent No.: US 8,384,966 B2
(45) Date of Patent: Feb. 26, 2013

(54) IMAGE FORMING DEVICE AND IMAGE FORMING METHOD

(75) Inventor: Kosuke Tsujita, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 301 days.

(21) Appl. No.: 12/851,004

(22) Filed: Aug. 5, 2010

(65) Prior Publication Data

US 2011/0038015 A1 Feb. 17, 2011

(30) Foreign Application Priority Data

Aug. 12, 2009 (JP) ................................. 2009-187376
Jul. 22, 2010 (JP) ................................. 2010-165064

(51) Int. Cl.
*H04N 1/40* (2006.01)
*H04N 1/04* (2006.01)

(52) U.S. Cl. ....................................... 358/448; 358/475

(58) Field of Classification Search ......................... None
See application file for complete search history.

(56) References Cited

U.S. PATENT DOCUMENTS

| 6,548,768 B1 | 4/2003 | Pettersson et al. | |
| 2007/0076261 A1* | 4/2007 | Ito | 358/3.28 |
| 2007/0109585 A1* | 5/2007 | Tanaka et al. | 358/1.14 |
| 2008/0192278 A1* | 8/2008 | Ouchi | 358/1.13 |
| 2008/0198394 A1* | 8/2008 | Hamada et al. | 358/1.9 |
| 2008/0297853 A1 | 12/2008 | Yang et al. | |
| 2009/0066977 A1 | 3/2009 | Yoshida | |
| 2009/0190183 A1* | 7/2009 | Hosoda | 358/3.28 |

FOREIGN PATENT DOCUMENTS

| EP | 1641238 A1 | 3/2006 |
| EP | 1959667 | 8/2008 |
| JP | 2008-205540 A | 9/2008 |

OTHER PUBLICATIONS

Mar. 28, 2012 Official Notice in JP Patent Application No. 2010-165064.
Feb. 3, 2011 European Search Report in EP Application No. 10172580.2.
Nov. 13, 2012 Official Notice in CN Patent Application No. 201010250144.4.

* cited by examiner

*Primary Examiner* — Twyler Haskins
*Assistant Examiner* — Henok Shiferaw
(74) *Attorney, Agent, or Firm* — Fitzpatrick, Cella, Harper & Scinto

(57) ABSTRACT

Another code image may be added so that a code image previously embedded in an original document image can be read. An image forming device may be configured to use, when a second code image is combined with the original document image including a first code image, a result of decoding of the first code image to generate a third code image; and also configured to combine the second code image with the original document image and combine the third code image on the second code image.

5 Claims, 8 Drawing Sheets

| TYPE OF DECODED CODE IMAGE | TYPE OF CODE IMAGE SET AND EMBEDDED IN MAIN BODY | DECODED CODE IMAGE REPRODUCED? |
|---|---|---|
| QR | LVBC | YES |
| LVBC | QR | NO |
| QR | QR | NO |
| LVBC | LVBC | NO |

FIG. 6

| COPYING PERMISSION/ PROHIBITION INFORMATION ON DECODED CODE IMAGE | COPYING PERMISSION/ PROHIBITION INFORMATION SET IN MAIN BODY | COPYING PERMISSION/ PROHIBITION INFORMATION ON CODE IMAGE TO BE REPRODUCED |
|---|---|---|
| PERMISSION | PROHIBITION | CHANGED TO PROHIBITION |
| PERMISSION | CONDITIONAL PROHIBITION | CHANGED TO PROHIBITION |

FIG. 8

IMAGE FORMING DEVICE AND IMAGE FORMING METHOD

BACKGROUND OF THE INVENTION

1. Field of the Invention

The present invention relates to an image forming device and an image forming method.

2. Description of the Related Art

Conventionally, there is known a technology in which a code image such as a barcode is added to an image document and printed (for example, Japanese Patent Laid-Open No. 2008-205540).

However, in a device that adds a code image for printing at the time of printing, when an original document image in which another code image is previously embedded is scanned and a code image is added to the scanned image, the code image previously embedded in the original document image cannot be read in some cases.

SUMMARY OF THE INVENTION

The present invention provides an image forming device and an image forming method in which another code image is added so that a code image previously embedded in an original document image can be read.

An image forming device according to one aspect of the present invention includes: a unit configured to determine, when a second code image is combined with an image including a first code image, whether or not the first code image fails to be read; a generation unit configured to decode, when the unit configured to make a determination determines that the first code image fails to be read, the first code image and use a result of the decoding to generate a third code image; and a unit configured to combine the second code image with the image and combine the third code image on the second code image.

According to the present invention, it is possible to provide an image forming device and an image forming method in which another code image is added so that a code image previously embedded in an original document image can be read.

Further features of the present invention will become apparent from the following description of exemplary embodiments (with reference to the attached drawings).

BRIEF DESCRIPTION OF THE DRAWINGS

FIG. 6 is a diagram showing conditions for determining whether or not a code image detected by scanning is reproduced;

FIG. 8 is a diagram showing conditions for determining whether or not copying permission/prohibition information that is included in a code image to be reproduced is changed.

DESCRIPTION OF THE EMBODIMENTS

An embodiment for implementing the present invention will be described below with reference to the accompanying drawings.

Example 1

Figure 1:
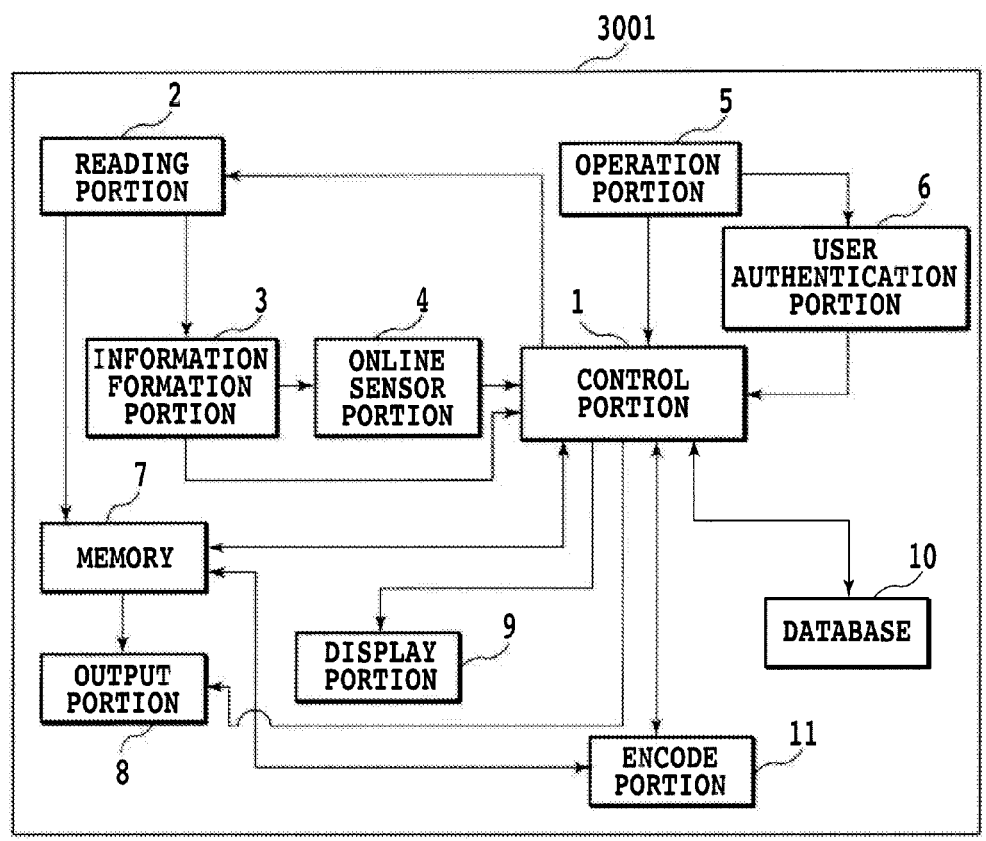
FIG. 1 is a block diagram showing an example of the configuration of an MFP.

FIG. 1 is a block diagram showing the configuration of an MFP 3001 as an example of an image forming device in this embodiment.

A control portion 1 controls each portion of the MFP 3001. An operation portion 5 is a user interface that receives an operation/input from a user. A user authentication portion 6 organizes the user authentication of the user who uses the MFP 3001. A reading portion 2 scans a printed document to form document information. The reading portion 2 also extracts a code image region included in the document information and stores it in a memory 7. An information formation portion 3 converts a code image included in the document information into information, and thereby obtains embedded information. An online sensor portion 4 decodes the embedded information, and thereby obtains copying prohibition information which is online information.

The memory 7 stores the document information obtained by the scanning. An output portion 8 reads the image information from the memory 7, and thereafter performs output such as the printing of the image information and the transmission of the image information to an external device. Here, the external device refers to, for example, a PC connected through a network to the MFP 3001. A display portion 9 displays a display screen through the control performed by the control portion 1. A database 10 records the setting information (including copying prohibition information, conditional copying prohibition information and tracking information) and logs of the MFP 3001. Here, the tracking information refers to information for identifying a person who has generated the document information (or a person who has performed the printing). For example, the tracking information includes a user name, a print date and time, a machine number of a printer (MFP 3001) and the like. Since the tracking information includes the print date and time and the machine number as information to identify a person who has created the document (or performed the printing), it is possible to identify the person who has created the document (or performed the printing), using a combination of this information and logs.

An encode portion 11 encodes the copying prohibition information (or the conditional copying prohibition information) and the tracking information to form the embedded information, and images the embedded information to form the code image. When the encoding is performed, an error correction code is added as described later.

The flow of the processing of individual blocks shown in FIG. 1 will now be described.

The user first inputs a user ID/password to the operation portion 5 while seeing a setting screen displayed on the display portion 9. The input information is transmitted from the operation portion 5 to the user authentication portion 6, and the user authentication portion determines whether or not the input password is an appropriate password. When the password is determined to be the appropriate password, the user authentication portion transmits the determination result and the user ID to the control portion 1.

Thereafter, in order to receive from the user an instruction as to whether or not the information is to be embedded in an image to be printed, the control portion 1, for example, displays on the display portion 9 a checkbox for checking "whether to embed the information". Furthermore, if the user checks the checkbox, the control portion 1 displays on the display portion 9 a screen for checking with the user what type of code image is used for adding the information. The information (specifically, information indicating what type of code image is used for performing the embedding and information indicating which of the copying prohibition information and the conditional copying prohibition information is embedded) that is input here by the user is stored as information of a main body setting by the control portion 1 in the database 10. Thereafter, when the user operates the operation portion 5 to provide a print instruction, the operation portion 5 transmits the instruction to the control portion 1. The setting for embedding information may be made such that it can be made through a driver or a utility of the PC connected to the MFP 3001. On the other hand, if the checkbox for checking "whether to embed the information" is not checked, the operation portion 5 transmits the fact to the control portion 1. In addition to a check of the checkbox for checking "whether to embed the information", the user can set through the operation portion 5 whether to embed the tracking information in the image to be printed. The information about whether to embed the tracking information, which is set by the user, is stored by the control portion 1 in the database 10.

Processing that is performed through the control by the control portion 1 after the processing described above will be described with reference to FIG. 2.

In step S101, the control portion 1 determines whether or not the checkbox is checked. In other words, the control portion 1 determines whether or not an instruction to embed information in an image to be printed is received from the user.

If the instruction to embed information is received, the process proceeds to step S102 whereas, if the instruction is not received, the process proceeds to step S119.

In step S102, the control portion 1 sets an operation for embedding information, and transmits the information and information to identify a current user of copying (e.g., the user ID) to the encode portion 11. The control portion 1 transmits a command to scan the printed document to the reading portion 2.

In step S103, the reading portion 2 scans the printed document to generate the document information, and transmits the document information to the memory 7 and the information formation portion 3.

In step S104, the information formation portion 3 reads a code image (a first code image) from the transmitted document information, and converts it into information to obtain the embedded information. The information formation portion 3 transmits this embedded information to the online sensor portion 4. Then, the online sensor portion 4 decodes the embedded information, and transmits the result to the control portion 1. The control portion 1 stores in the database 10 (1) information as to whether or not the decoding is achieved, (2) information as to the type of code image decoded if the decoding is achieved and (3) the result of the decoding (information obtained by decoding the embedded information). For example, when a QR code within the scanned document is successfully decoded, the control portion 1 stores in the database 10 (1) information indicating that the decoding is successfully performed, (2) information of the QR code and (3) the result of the decoding (for example, copying permission/prohibition information indicating permission for copying or prohibition for copying, and the tracking information).

Figure 2:
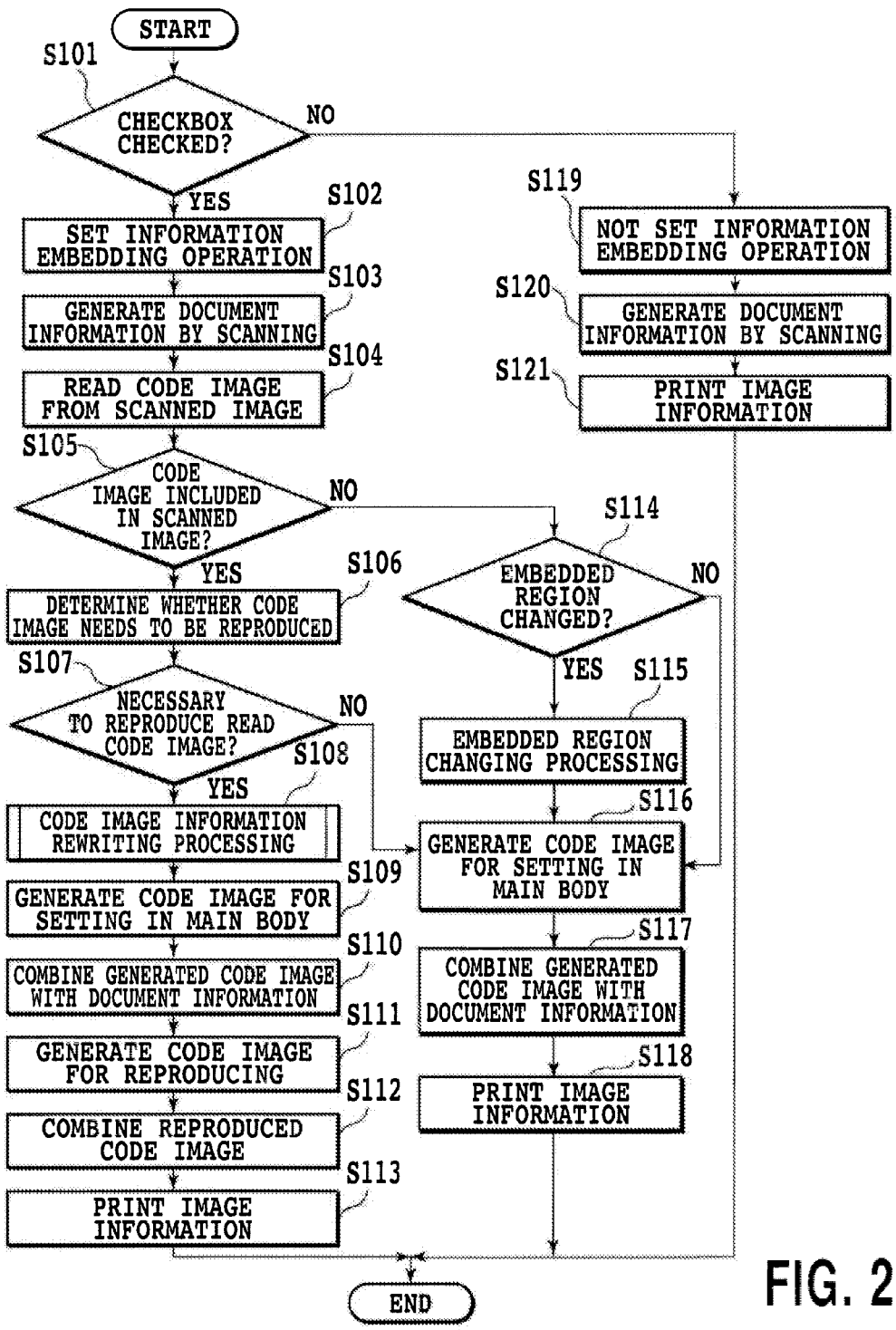
FIG. 2 is a diagram showing an example of processing performed by the MFP.

In step S105, the control portion 1 references the information (1) described above in the database 10 to determine whether or not the code image has been read from the scanned document. In case that the code image has been read and the information (3) indicates copying permission, the process proceeds to step S106 whereas, in case that the code image has not been read, the process proceeds to step S114. In case that the code image has been read and the information (3) indicates copying prohibition, this printing process of the scanned image is terminated (namely, the flow shown in FIG. 2 is terminated).

In step S106, the control portion 1 reads from the database 10 the information as to the type of code image decoded and the information as to the type of code image newly added in the MFP 3001, references a table shown in FIG. 6 and determines whether or not the code image extracted from the scanned document is reproduced. Processing for reproducing the code image will be described later. Here, the type of code image newly added in the MFP 3001 refers to the type of code image embedded that is input from the operation portion 5 after the user checks the checkbox.

For example, when the type of code image decoded is a QR code, and the type of code image newly added in the MFP 3001 is an LVBC (low visibility bar code), the decoded code image is determined to be reproduced. This is because, if the LVBC is combined on the QR code, the QR code cannot be read. Specifically, whether or not the code image is reproduced is determined according to whether, when a code image is newly added to the scanned document (original document image), the code image previously embedded in the document fails to be read.

Thus, when the type of code image decoded is the LVBC, and the type of code image newly added in the MFP 3001 is the QR code, the decoded code image is not reproduced. This is because, even if the QR code is combined on the LVBC code and part of the LVBC is lost, information embedded in the LVBC code can be read. In this case, since it is unnecessary to reproduce the code image decoded from the scanned document, it is also advantageously possible to reduce a period of time required until the completion of the printing.

In another example, when the type of code image extracted from the scanned document and decoded is the LVBC, and the type of code image embedded is the LVBC, the decoded code image is not reproduced, either. This is because, since the LVBC code is embedded over the entire scanned document, in order to reproduce the LVBC code, it is necessary to remove the LVBC code from the scanned document image, and this removal processing requires a large amount of time. In other words, when, in order to reproduce the previously embedded code image, it is necessary to remove the code image from the scanned entire document image, the code image is not reproduced. In this case, even when, as described above, the addition of a new code image prevents the previously embedded code image from being read, the code image is not reproduced.

In step S107, the process branches according to the determination in step S106. If the decoded code image is reproduced, the process proceeds to step S108. If the decoded code image is not reproduced, the process proceeds to step S116.

Figure 7:
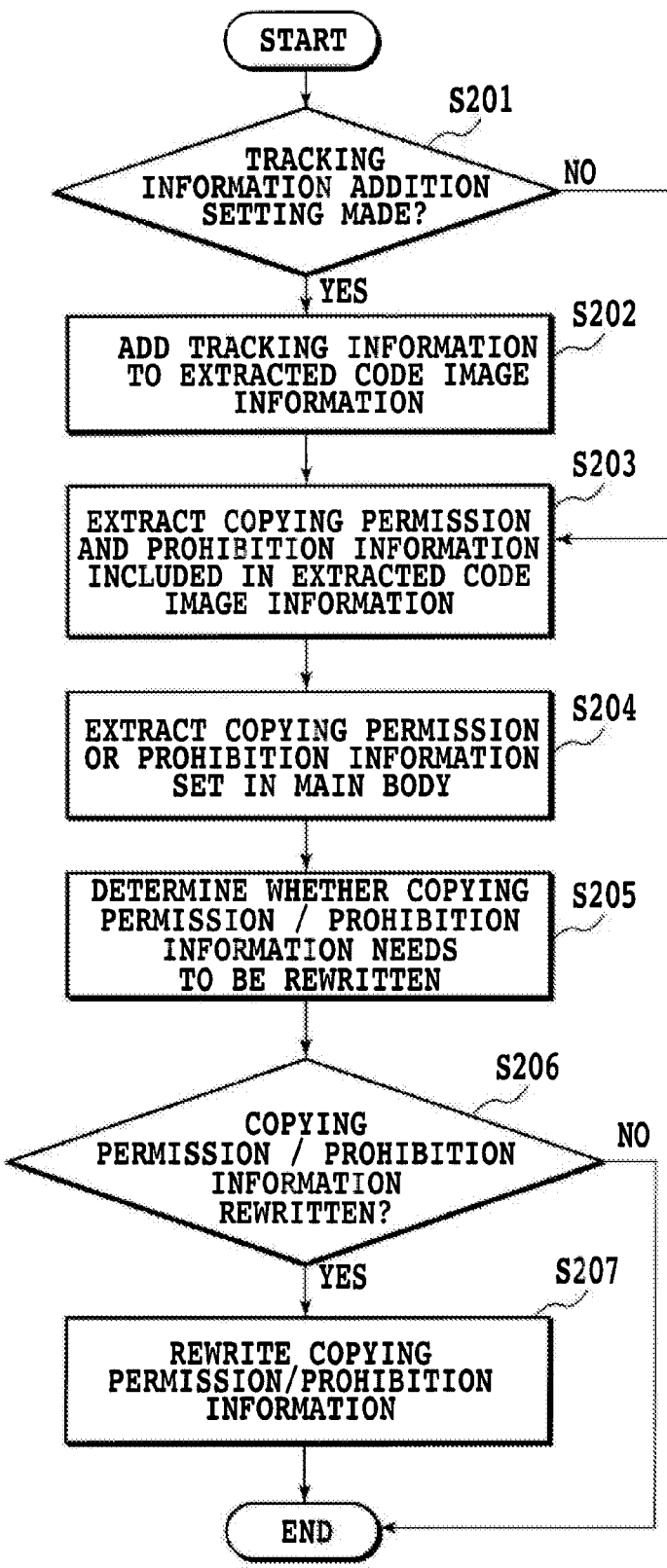
FIG. 7 is a diagram showing an example of processing performed by the MFP.

In FIG. 7, the detailed processing procedure of code image rewriting processing performed in step S108 is shown. This processing is to determine information which is included in a code image combined in step S112 of FIG. 2.

In step S201, the control portion 1 first references the database 10 and determines whether or not it is necessary to add the tracking information as the embedded information. As described above, if the setting is performed through the operation of the operation portion 5 by the user such that the tracking information is added to the document image, it is determined to be necessary to add the tracking information. If it is necessary to add the tracking information, the process proceeds to step S202 where the tracking information is added as the embedded information. Namely, the tracking information at this time is further added to the tracking information obtained in step S104. The tracking information at this time refers to information to identify a user who is currently operating the operation portion 5. For example, the information to identify the user includes a user name, a printing date and time, and a machine number.

In step S203, the control portion 1 reads the copying permission/prohibition information from the information (that is, the result obtained by decoding the first code image) stored in the database 10 in step S104 and previously included in the code image of the scanned document. It is assumed that the copying permission/prohibition information indicating either of copying permission and copying prohibition is embedded in the code image read in step S104. In this process flow, processing performed when the type of code image read in step S104 is the QR code will be described.

In step S204, the control portion 1 acquires, from the database 10, information (including copying permission/prohibition information) that is included in a code image (second code image) to be embedded by the MFP 3001. Namely, the control portion 1 acquires the copying permission/prohibition information (indicating copying permission, copying prohibition and conditional copying prohibition) on the second code image. In this process flow, processing performed when the type of code image in which the acquired copying permission/prohibition information is embedded by the MFP 3001 is the LVBC will be described.

In step S205, the control portion 1 references the information extracted in steps S203 and S204 and the table shown in FIG. 8, and determines whether or not the copying permission/prohibition information that is included in the code image to be reproduced is changed. For example, if the code image (first code image, i.e., QR code in this embodiment) of the scanned document is of copying permission, and the code image (second code image, i.e., LVBC in this embodiment) newly added in the MFP 3001 (the main body) is of copying prohibition, the copying permission/prohibition information of the code image (third code image, i.e., QR code in this embodiment) to be reproduced is set to copying prohibition (that is, the copying permission/prohibition information is changed from copying permission to copying prohibition). In order for the copying permission/prohibition information of more strict conditions to be set as described above, whether or not the change of the copying permission/prohibition information is needed is determined.

Alternatively, in the code image newly added in the MFP 3001, the copying permission/prohibition information indicating conditional copying prohibition can be included. The conditional copying prohibition means that the user ID and the password are requested at the time of copying and that whether or not the copying is performed is determined. For example, when the copying permission/prohibition information indicating copying permission is embedded in the QR code of the scanned document, and the copying permission/prohibition information indicating conditional copying prohibition is embedded in the LVBC added in the MFP 3001, the copying permission/prohibition information that is included in the QR code to be reproduced is changed to copying prohibition. The reason why the copying permission/prohibition information is changed to the copying prohibition is as follows. When the LVBC code is combined to form a document without the copying permission/prohibition information included in the QR code of the scanned document being changed, a document in which the QR code indicates copying permission and the LVBC code indicates conditional copying prohibition is generated. This type of document is copied by, for example, a copying machine that can read information coded by a QR code but cannot read information coded by an LVBC code. In order for this to be avoided, copying permission/prohibition information having more strict conditions than that set in the main body is set in the image code to be reproduced. Although, in this example, the three types of copying permission/prohibition information are described by way of example, the present invention is not limited to this. As copying permission/prohibition conditions, known conditions can be applied. In the same manner as described above, it is possible to determine whether or not it is necessary to change the copying permission/prohibition information.

As described above, in the code image (third code image, i.e., QR code) to be reproduced, copying permission/prohibition information having the same conditions as or more strict conditions than the copying permission/prohibition information set in the code image (second code image, i.e., LVBC) newly added in the MFP 3001 is set. By performing the setting in this way, it is possible to prevent the copying of the document contrary to the setting of the copying permission/prohibition information newly added in the MFP 3001.

In step S206, the control portion 1 branches the process according to the determination result in step S205. If the copying permission/prohibition information that is embedded in the code image to be reproduced is changed from copying permission to copying prohibition, the process proceeds to step S207. If the copying permission/prohibition information that is embedded in the code image to be reproduced is not changed, this flow is terminated, and the process proceeds to step S109 in FIG. 2.

In step S207, the control portion 1 references the database 10, and changes the copying permission/prohibition information of the code image to be reproduced from copying permission to copying prohibition. After the change is made, the process proceeds to step S109 in FIG. 2.

In step S109, the control portion 1 acquires information of main body setting from the database 10. Then, the control portion 1 causes the encode portion 11 to encode these pieces of information, and to generate the code image (second code image), which is the embedded information that is imaged. Then, the control portion 1 transmits the generated code image to the memory 7.

In step S110, when the control portion 1 detects that the memory 7 has received the code image generated in step S109 and the document information generated in step S103, image information is generated by combining both of them in the memory 7. In other words, the second code image is combined with the original document image.

In step S111, the control portion 1 encodes the copying permission/prohibition information and the tracking information set in step S108 to obtain the result of the encoding (embedded information), and images the embedded information to generate the code image (third code image). Namely, the control portion 1 generates the third code image from the result obtained by decoding the first code image read in step S109. The copying permission/prohibition information set in step S108 indicates copying permission or copying prohibition. If the determination in step S206 is YES, the copying permission/prohibition information indicates copying prohibition. If the determination in step S206 is NO, the copying permission/prohibition information indicates copying permission. In addition, the tracking information could indicate two types of the tracking information. The first type of tracking information indicates "the tracking information included in the first code image" (corresponding to the case that the determination in S201 is NO). The second type of tracking information indicates "the tracking information included in the first code image" and "the tracking information at this time" (corresponding to the case that the determination in S201 is YES).

In step S112, the control portion 1 combines the code image generated in step S111 with the image information generated in step S110 to generate image information.

Namely, by performing the processing described above, the second code image is combined with the original document image, and the third code image is combined on the second code image. By combining the code images together in this way, a code image is newly added to the original document image in which the code image is previously included, and thus it is possible to avoid failing to read the previously embedded code image.

In step S113, the control portion 1 transmits the generated image information from the memory 7 to the output portion 8, and causes the output portion 8 to perform the printing.

If the checkbox for checking "whether to embed the information" is not checked as described above, the process proceeds to step S119 where the control portion 1 does not set the operation for embedding the information, and instructs the reading portion 2 to scan the printed document.

In step S120, the reading portion 2 scans the printed document to generate document information, and transmits it to the memory 7. If it is set through the operation portion 5 to embed the tracking information in the image to be printed as described above, the tracking information at this time is embedded in the generated document (namely, the tracking information at this time is encoded, and then the code image obtained thereby is combined in the document information). However, in case that the generated document information preliminarily includes a code image and the code image includes information indicating copying prohibition, this printing process of the scanned image is terminated (namely, the flow shown in FIG. 2 is terminated).

Thereafter, when the control portion 1 detects that the memory 7 has received the document information, the process proceeds to step S121 where the control portion 1 transmits the generated document information as image information from the memory 7 to the output portion 8 and causes the output portion 8 to perform the printing.

Processing performed when the code image is not included in the scanned document will now be described. If the checkbox is checked in step S101, and the code image is not included in the scanned image in step S105, the control portion 1 makes the process proceed to step S114.

In step S114, the control portion 1 references the database 10, and displays, on the display portion 9, information indicating whether or not an embedded region where the code image is embedded is changed. Here, the reason why the embedded region is changed will be described. For example, consider a case where a document having the QR code printed is copied by a copying machine that can embed the LVBC code but cannot recognize the QR code. Since the QR code included in the document cannot be read by scanning the document, when the main body of the copying machine prints the LVBC code, the printing is performed such that the region of the QR code is also overwritten with the LVBC code. Thus, the QR code fails to be read from the printed document. In consideration of this case, in order to avoid failing to read the previously printed code image with another code image being overwritten thereon, processing for changing, with the main body, the embedded region where the code image is embedded is performed. For example, if the user operates the operation portion 5 to select the changing, the process proceeds to step S115. If the user does not select the changing, the process proceeds to step S116.

In step S115, the control portion 1 references the database 10, and displays, on the display portion 9, an embedded region format. When the user selects one of embedded region patterns, the control portion 1 stores the embedded region pattern selected by the user in the database 10, and makes the process proceed to step S116.

In step S116, the control portion 1 acquires, from the database 10, the copying permission/prohibition information and the tracking information (which includes the user ID and is information originally included in the scanned document) set by the main body and the embedded region pattern selected by the user. Then, the control portion 1 causes the encode portion 11 to encode these pieces of information, and to image the result of the encoding (embedded information) thus obtained to generate the code image. Then, the control portion 1 transmits the generated code image to the memory 7.

Thereafter, when the control portion 1 detects that the memory 7 has received the code image and the document information, the process proceeds to step S117 where the image information is generated by combining both of them in the memory 7.

Then, in step S118, the control portion 1 transmits the generated image information from the memory 7 to the output portion 8, and causes the output portion 8 to perform the printing.

If, in step S107, the control portion 1 determines that it is unnecessary to reproduce the read code image, the process proceeds to step S116.

In step S116, the control portion 1 extracts, from the database 10, the copying permission/prohibition information and the tracking information (which includes the user ID and is information originally included in the scanned document) set by the main body. Then, the control portion 1 causes the encode portion 11 to encode these pieces of information, and to image the result of the encoding (embedded information) thus obtained to generate the code image. Then, the control portion 1 transmits the generated code image to the memory 7.

Thereafter, when the control portion 1 detects that the memory 7 has received the code image and the document information, the process proceeds to step S117 where the image information is generated by combining both of them in the memory 7. Then, in step S118, the control portion 1 transmits the generated image information from the memory 7 to the output portion 8, and causes the output portion 8 to perform the printing.

The tracking information includes, for example, information useful for identifying the printing person, such as a print date and time, the user name (that is, the user ID) of the user who provides the print instruction and the name of the device. In this specification, the tracking information is defined as information that can be used for identifying the user.

Here, an example of a method of encoding the copying permission/prohibition information and the tracking information and imaging the result of the encoding will be described with reference to FIGS. 3 and 5.

Figure 5:
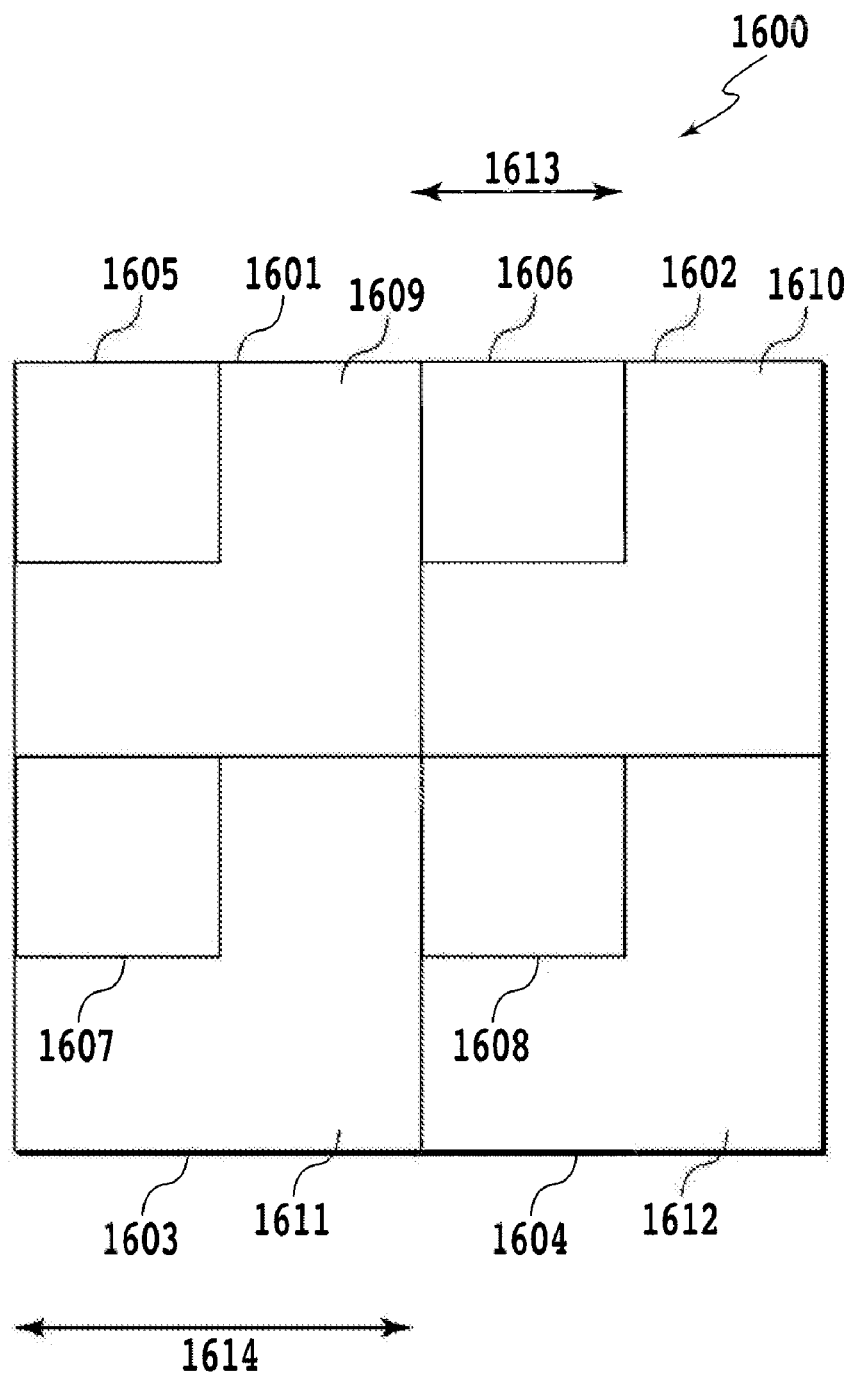
FIG. 5 is a diagram showing an example of the arrangement of a region where information is embedded.

FIG. 5 is a supplemental diagram for illustrating a unit code image 1600.

The unit code image 1600 measures about 1 cm by 1 cm, and is composed of high-density regions (1605 to 1608) and low-density regions (1609 to 1612).

In the high-density regions, the result obtained by encoding the prohibition information is included; in the low-density regions, the result obtained by encoding the tracking information is included. A large number of error correction codes are used in the high-density regions as compared with the low-density regions (that is because the prohibition information is considered to be more important than the tracking information). The reason why, although a large number of error correction codes are used, the region where the prohibition information is included is smaller is that the prohibition information is smaller in data size. This unit code image 1600 is repeatedly combined over the entire surface of the document information.

For example, when the document information is printed on an A4 size (21 cm by 29.7 cm) sheet, 21 by 29 unit code images are combined with the document information. Thus, 609 identical pieces of information are combined.

In this specification, all unit code images (609 unit code images) that are combined with the document information or part of the unit code images are referred to as a code image.

Figure 3:
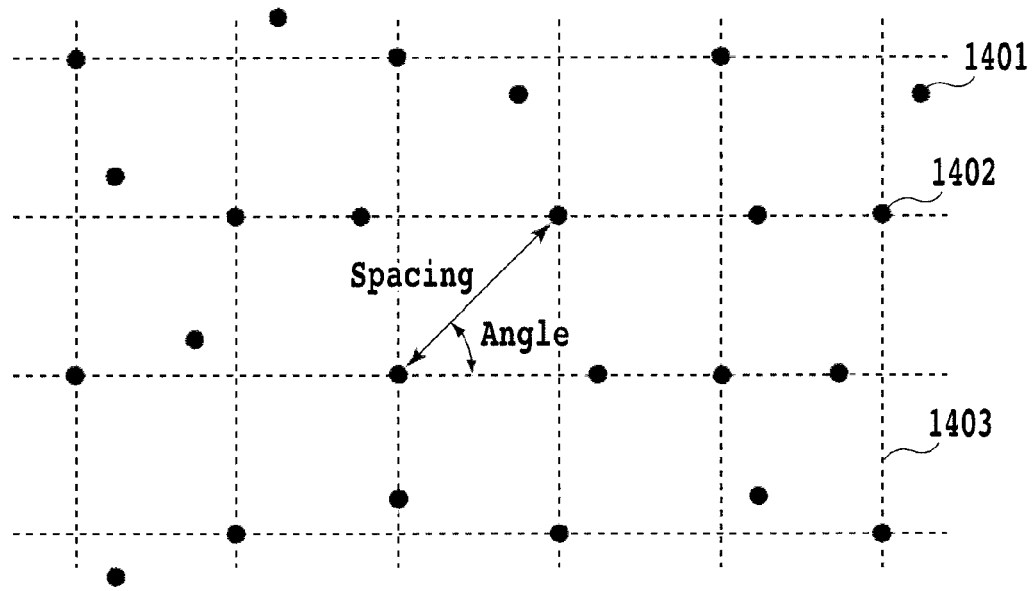
FIG. 3 is a diagram for illustrating a unit code image.

FIG. 3 is a diagram showing what types of dots are included in the region 1605 shown in FIG. 5. In this region, information dots 1401 and arrangement dots 1402 are included. The arrangement dots 1402 are regularly spaced on reference grids 1403 represented by dotted lines (specifically on the intersections of the reference grinds 1403). The information dots are arranged in positions displaced from the intersections of the reference grinds 1403.

In a direction displaced as described above (a direction in which the displaced positions are displaced with respect to the intersections), the result obtained by encoding the copying permission/prohibition information is expressed. In other words, the embedded information (part of which is the result obtained by encoding the copying permission/prohibition information) obtained by encoding the copying permission/prohibition information is imaged, and thus the unit code image including the information dots 1401 and the arrangement dots 1402 can be formed.

In the other regions 1606 to 1608 also, the same dots obtained by imaging the same information in the same manner are included (so that redundancy is acquired).

In the regions 1609 to 1612, dots obtained by imaging the embedded information (part of which is the result obtained by encoding the tracking information) are included; the method of performing the imaging is the same as that used in the regions 1605 to 1608.

In this specification, the encoding refers to all the processing below: (i) the copying permission/prohibition information and/or the tracking information is encoded to form the embedded information; (ii) this embedded information is imaged to form the unit code images; and (iii) the unit code images (for example, 609 images) are arranged vertically and horizontally. The encoding is performed by the encode portion 11.

The reference grids described above are drawn by dotted lines in FIG. 3 but are not printed actually.

Figure 4:
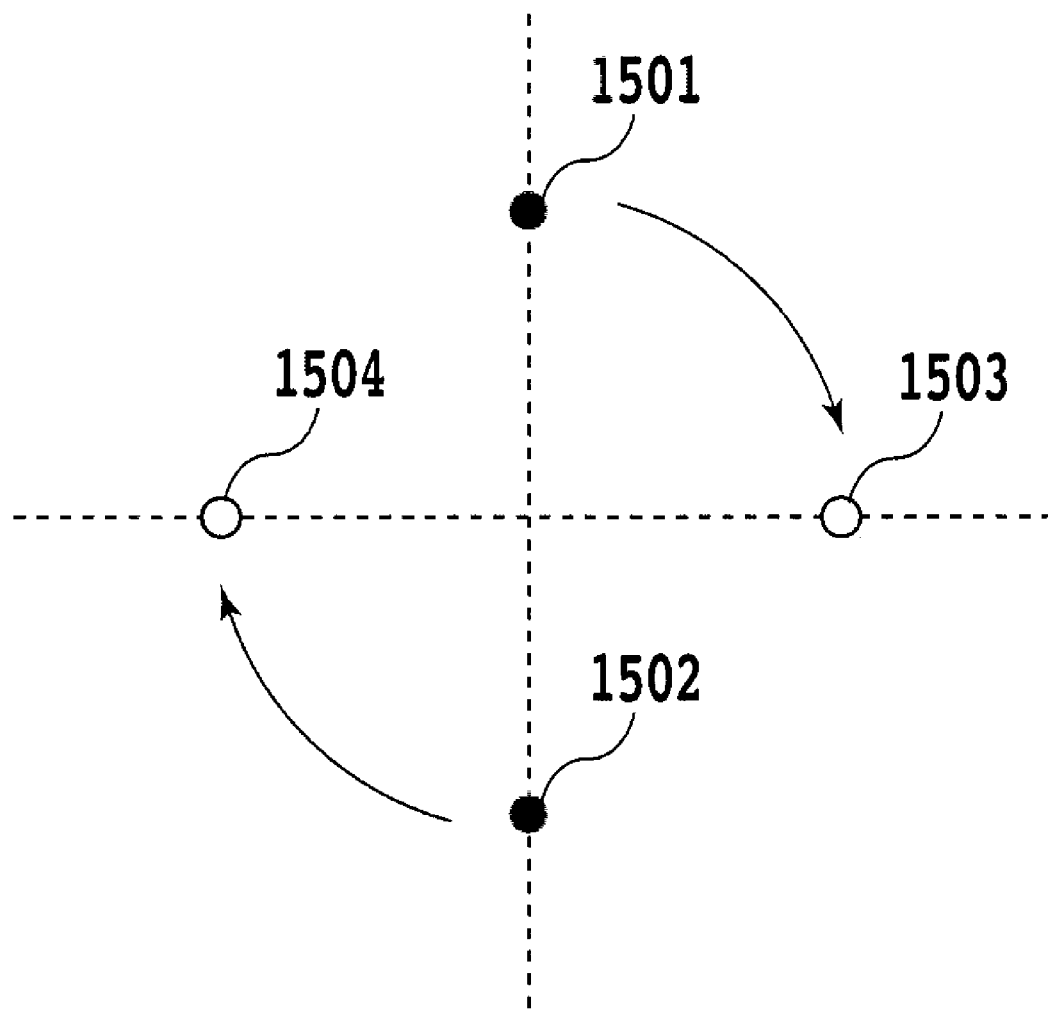
FIG. 4 is a diagram for illustrating a correction of a grid rotation angle.

How these imaginary lines are detected will be described with reference to FIG. 4. This processing is performed by the information formation portion. First, the information formation portion 3 arbitrarily selects a dot 1501. Then, the information formation portion 3 arbitrarily selects a dot 1502 present around the selected dot. Then, the information formation portion 3 turns the positions of these selected dots by 90 degrees about the center point between both the dots. If dots are present in the positions resulting from the turning, the selected dots are determined by the information formation portion 3 to be the arrangement dots, which should be regularly spaced vertically and horizontally.

On the other hand, if dots are not present, the selected dots are determined by the information formation portion 3 to be the information dots, which should be arranged randomly. In this way, the information formation portion 3 detects the two arrangement dots; all the other arrangement dots are detected by utilizing the restriction condition that the arrangement dots be regularly spaced vertically and horizontally.

After all the arrangement dots are detected, the information formation portion 3 draws the reference grids on these arrangement dots in an imaginary manner, finally determines the direction in which the remaining dots (that is, the information dots) are displaced from the intersections of the reference grids, and obtains the embedded information.

In this specification, information is obtained from the dot: if the dot is displaced in an upward direction, information "0" is obtained; if the dot is displaced in an upper rightward direction, information "1" is obtained; and if the dot is displaced in a rightward direction, information "2" is obtained.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2009-187376, filed Aug. 12, 2009, and 2010-165064, filed Jul. 22, 2010, which are hereby incorporated by reference herein in their entirety.

What is claimed is:

1. An image forming device comprising:
   a unit configured to obtain an image by scanning a printed document;
   a unit configured to determine whether the obtained image includes a first type of code image or a second type of code image;
   a unit configured to determine whether the first type of code image or the second type of code image is to be embedded in the obtained image; and
   a generation unit configured to (a), when it is determined that the obtained image includes the first type of code image and that the second type of code image is to be embedded in the obtained image, regenerate the first type of code image based on information included in the first type of code image in the obtained image, combine the second type of code image with the obtained image to obtain a combined image, combine the regenerated first type of the code image with the combined image to obtain another combined image and output the another combined image, and (b), when it is determined that the obtained image includes the second type of code image and that the first type of code image is to be embedded to the obtained image, combine the first type of code image with the obtained image to obtain another combined image and output the another combined image, wherein the first type of code image is a code image which is combined with a part of an image and the second type of code image is a code image which is combined with an entire image.

2. The image forming device of claim 1, wherein, when copying permission or prohibition information included in the first type of code image included in the obtained image indicates copying permission and copying permission or prohibition information on the second type of code image indicates copying prohibition, the generation unit regenerates the first type of code image such that the first type of code image includes copying permission or prohibition information indicating copying prohibition.

3. An image forming method comprising the steps of:

obtaining an image by scanning a printed document;

determining whether the obtained image includes a first type of a code image or a second type of a code image;

determining whether a first type of a code image or a second type of a code image is to be embedded to the obtained image; and (a), when it is determined that the obtained image includes the first type of code image and that the second type of code image is to be embedded to the obtained image, regenerating the first type of code image based on information included in the first type of code image in the obtained image, combining the second type of code image with the obtained image to obtain a combined image, combining the regenerated first type of the code image with the combined image to obtain another combined image and outputting the another combined image, or (b), when it is determined that the obtained image includes the second type of code image and that the first type of code image is to be embedded to the obtained image, combining the first type of code image with the obtained image to obtain another combined image and outputting the another combined image, wherein the first type of code image is a code image which is combined with a part of an image and the second type of code image is code image which is combined with an entire image.

4. A non-transitory computer-readable recording medium having computer-executable instructions for performing a method, the method comprising the steps of:

obtaining an image by scanning a printed document;

determining whether the obtained image includes a first type of a code image or a second type of a code image;

determining whether a first type of a code image or a second type of a code image is to be embedded to the obtained image; and (a), when it is determined that the obtained image includes the first type of code image and that the second type of code image is to be embedded to the obtained image, regenerating the first type of code image based on information included in the first type of code image in the obtained image, combining the second type of code image with the obtained image to obtain a combined image, combining the regenerated first type of the code image with the combined image to obtain another combined image and outputting the another combined image, or (b), when it is determined that the obtained image includes the second type of code image and that the first type of code image is to be embedded to the obtained image, combining the first type of code image with the obtained image to obtain another combined image and outputting the another combined image, wherein the first type of code image is a code image which is combined with a part of an image and the second type of code image is code image which is combined with an entire image.

5. The image forming method of claim 3, wherein, when copying permission or prohibition information included in the first type of code image included in the obtained image indicates copying permission and copying permission or prohibition information on the second type of code image indicates copying prohibition, the first type of code image is regenerated such that the first type of code image includes copying permission or prohibition information copying prohibition.

\* \* \* \* \*